United States Patent
Alpay

(10) Patent No.: US 8,378,252 B2
(45) Date of Patent: Feb. 19, 2013

(54) METHOD AND APPARATUS FOR HYBRID RESOLUTION FEEDBACK OF A MOTION STAGE

(75) Inventor: Mehmet Ermin Alpay, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 302 days.

(21) Appl. No.: 12/788,583

(22) Filed: May 27, 2010

(65) Prior Publication Data

US 2010/0301028 A1 Dec. 2, 2010

Related U.S. Application Data

(60) Provisional application No. 61/182,469, filed on May 29, 2009.

(51) Int. Cl.
*G02F 1/01* (2006.01)
*B23K 26/36* (2006.01)
*B23K 26/00* (2006.01)

(52) U.S. Cl. ........... 219/121.61; 219/121.6; 219/121.69; 219/121.85; 385/33; 438/132; 438/463; 438/487; 257/763; 257/797; 257/926; 257/E21.006; 257/E21.592; 257/E21.596; 257/E21.599

(58) Field of Classification Search ............... 219/121.6, 219/121.61, 121.69, 121.85; 385/33; 438/132, 438/463, 487; 257/763, 797, 926, E21.005, 257/E21.592, E21.596
See application file for complete search history.

(56) References Cited

U.S. PATENT DOCUMENTS

| | | | |
|---|---|---|---|
| 3,563,186 A | 2/1971 | Piper et al. | |
| 4,985,780 A | 1/1991 | Garnier et al. | |
| 6,144,118 A | 11/2000 | Cahill et al. | |
| 6,246,204 B1 | 6/2001 | Ebihara et al. | |
| 6,389,702 B1 | 5/2002 | Dudley | |
| 6,555,983 B1 | 4/2003 | Davies | |
| 6,744,228 B1 | 6/2004 | Cahill et al. | |
| 6,921,615 B2 | 7/2005 | Sreenivasan et al. | |
| 7,705,996 B2 | 4/2010 | Kim et al. | |
| 8,106,329 B2 * | 1/2012 | Gu et al. | 219/121.61 |
| 2002/0039436 A1 * | 4/2002 | Alumot et al. | 382/149 |
| 2002/0097925 A1 | 7/2002 | Kafai | |
| 2003/0089690 A1 * | 5/2003 | Yamazaki et al. | 219/121.66 |
| 2004/0140780 A1 * | 7/2004 | Cahill et al. | 318/114 |
| 2006/0184335 A1 | 8/2006 | Odom | |
| 2006/0256184 A1 * | 11/2006 | Hanks | 347/234 |
| 2010/0014099 A1 * | 1/2010 | Christoph et al. | 356/602 |

FOREIGN PATENT DOCUMENTS

| | | |
|---|---|---|
| JP | 06-236932 A | 8/1994 |
| JP | 08-174256 A | 7/1996 |
| KR | 2002-38931 A | 7/2002 |
| KR | 10-0480435 B1 | 4/2005 |
| WO | WO 01/54854 A1 | 8/2001 |

OTHER PUBLICATIONS

International Preliminary Report of PCT/US2010/036556, 4 pages.

* cited by examiner

*Primary Examiner* — Dao H Nguyen

(57) ABSTRACT

A method and apparatus is presented for obtaining high resolution positional feedback from motion stages 52 in indexing systems 10 without incurring the costs associated with providing high resolution positional feedback from the entire range of motion by combining low resolution/low cost feedback devices 72 with high resolution/high cost feedback devices 74, 76, 78, 80, 82, 84, 86, 88.

15 Claims, 3 Drawing Sheets

METHOD AND APPARATUS FOR HYBRID RESOLUTION FEEDBACK OF A MOTION STAGE

This application claims priority from provisional application No. 61/182,469, filed on May 29, 2009.

TECHNICAL FIELD

This invention relates to methods and apparatus for obtaining feedback related to the position of a motion stage in laser processing systems. In particular it relates to obtaining high-resolution positional feedback from a motion stage designed to index articles between processing or load/unload positions in laser processing systems used in the manufacture of electronics. In more particular it relates to methods and apparatus for obtaining high-resolution positional feedback from motion stages using coarse and fine resolution feedback devices in tandem.

BACKGROUND INFORMATION

High resolution positional feedback is a requirement of many precision motion systems, in particular motion systems designed to fixture articles for laser processing systems used in the manufacture of electronics. Laser processing systems typically are used to remove material from articles, mark the surface or interior of articles, singulate articles fabricated on a common substrate, or anneal or otherwise condition the article. Articles can be made of metals, such as aluminum or steel, glass or glass like materials or various plastics. Articles can be substrates such as semiconductor wafers or printed wiring boards, devices such as integrated circuits or electro-optical devices, assemblies such as displays or sensors or packaging components such as enclosures.

Some laser processing systems are constructed with motion stages that can fixture more than one article at a time in order to increase system throughput. These systems have motion stages that move articles from positions where they can be loaded or unloaded, to positions for laser processing, and possibly positions for other operations such as further laser processing or inspections. An exemplary laser processing system that performs these functions is the ESI ML5900 Laser Micromachining System, manufactured by Electro Scientific Industries, Portland, Oreg. 97229. FIG. 1 shows a diagram of a typical laser processing system such as the ESI ML5900. These systems have to index articles relatively long distances between positions while maintaining accuracy which is a small fraction of the distance moved. This motion could be rotary, linear, such as a continuous belt, or reciprocating. For example, a rotary stage may move an article the equivalent of several centimeters and require that the article's position be known to within several microns at the end of the motion. This could be accomplished by building the equipment with the requisite mechanical precision to accomplish this task, but the cost and time to operate are both high. The approach typically used is to build the mechanical components to within normal manufacturing tolerances and then instrument the motion stages with encoders to indicate the position of the stage. Typical approaches to the problem involve the use of high quality linear or rotary optical encoders of fine grid pitch or linear interferometers to provide high resolution feedback throughout the motion systems' travel range. Both solutions are well-established, however the costs associated with providing such high resolution feedback throughout the entire travel range is large. FIG. 2 shows a typical prior art rotary stage indexing system.

There are no evident industry solutions to position feedback requirements that combine low resolution-low cost feedback devices with high resolution-high cost devices. Accordingly, there is a continuing need for a method and apparatus for obtaining high resolution positional feedback data from motion stages at costs that are between low resolution-low cost devices and high resolution/high cost devices.

SUMMARY OF THE INVENTION

Aspects of the instant invention improve laser processing by providing both low resolution and high resolution positional feedback from a motion stage that is designed to index between predetermined positions. Aspects of the instant invention use a low resolution/low cost device to provide coarse location information from the motion stage as it moves between indexed positions. An existing laser micromachining system, the ESI ML5900, is adapted to implement aspects of this invention. The ESI ML5900 has a motion stage which indexes between positions as it processes articles. "Indexing" refers to motion stages that have one or more positions within the total range of travel of the stages that the system returns to repeatedly in the course of processing articles. These positions may be positions where the articles are loaded or unloaded from the stage or positions where laser processing or other operations such as inspections take place. High resolution/high cost feedback devices are applied to the motion stages in the vicinity of these index positions so that when the low resolution feedback device indicates that the motion stage is in the vicinity of an index position, the system can access the position feedback information from a high resolution feedback device installed in the vicinity of the index position and thereby have high resolution information regarding the position of the motion stage without the costs associated with providing high resolution positional feedback over the entire range of travel of the motion stage.

DETAILED DESCRIPTION OF THE PREFERRED EMBODIMENTS

Am embodiment of this invention improves laser processing of articles with a laser processing system by providing a low resolution positional feedback device indicate the position of a motion stage throughout its range of travel. This embodiment directs the motion stage to move to a first position indicated by the low resolution positional feedback device and further provides a high resolution positional feedback device in the vicinity of the first position. These embodiments then directs the motion stage to move to a second position indicated by the high resolution positional feedback device, thereby providing the laser processing system with high resolution positional accuracy without requiring high resolution feedback throughout its range of travel.

Figure 1:
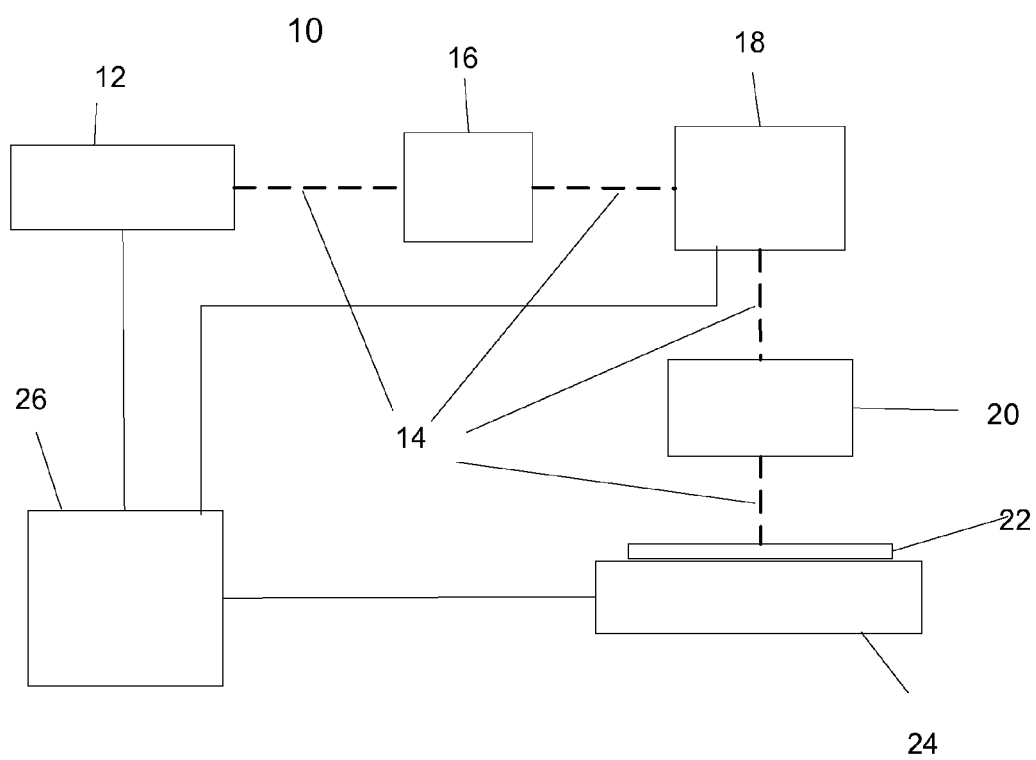
FIG. 1. Prior art laser processing system.

Laser processing systems process articles by positioning them with respect to a laser beam and then directing the laser beam to emit energy which impinges the article. FIG. 1 shows a typical prior art laser processing system 10 having a laser 12 which emits laser pulses 14. These pulses 14 are shaped by beam shaping optics 16, which can optionally shape the laser pulses spatial and temporal distributions from the typical Gaussian distribution pulses emitted by lasers to form desired spatial distributions such as top hat distributions or desired pulse temporal distributions such as tailored pulses. The pulses 14 are then re-directed by beam steering optics 18 which direct the laser beam to desired locations on the article using galvanometers, fast steering mirrors, deformable mirrors, electro-optic devices, or acusto-optic devices to steer the beam. The laser pulses are the directed through optional field optics 20 to impinge the article 22 which is fixtured on a motion stage 24. The motion of the motion stage 24 is combined with the steering of the beam steering optics 18 by the controller 26 which coordinates and directs the operations of the laser 12, beam steering optics 18 and motion stage 24.

Figure 2:
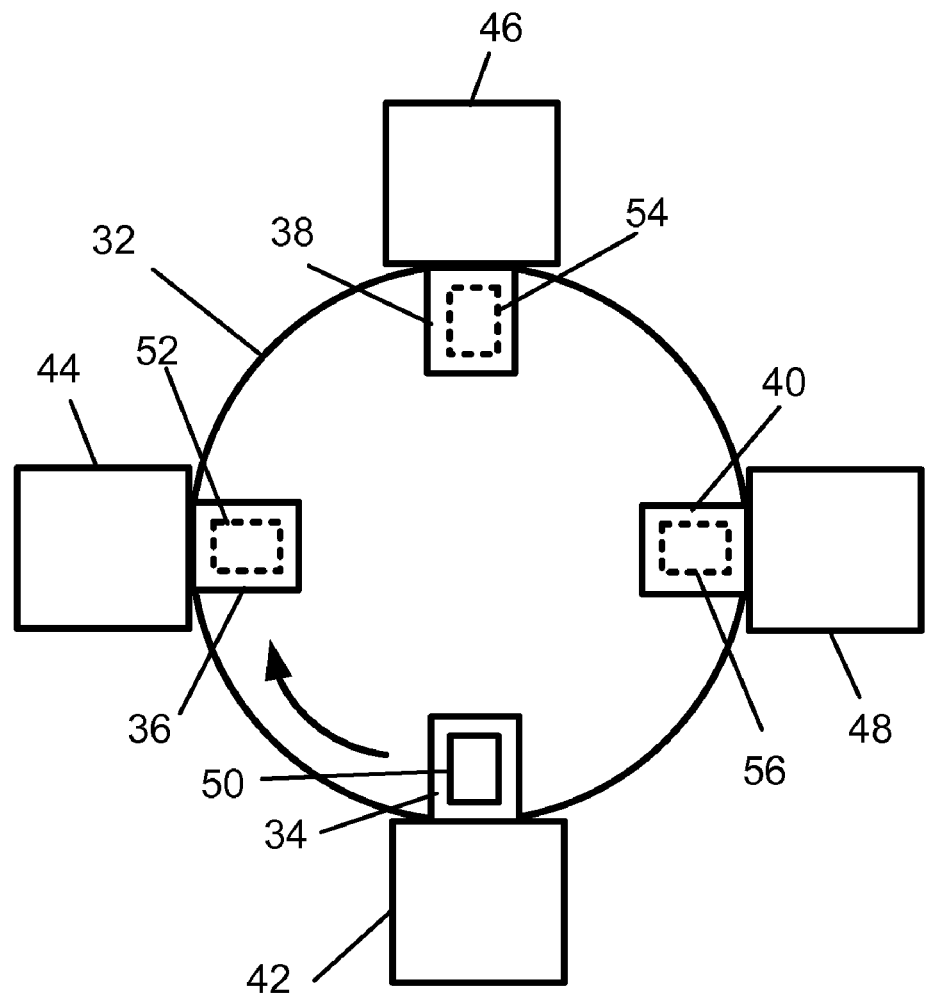
FIG. 2. Prior art indexing motion stage.

A typical use of a motion system involves accurately positioning parts with respect to processing station for machining purposes. A particular scenario for this type of usage is a motion system that comprises a rotary table that has a finite number of discrete indexing positions. Moving sequentially from one index position to the next will then position the next part within the processing field. FIG. 2 shows such a rotary indexing table 32, having four fixtures 34, 36, 38, 40 for holding articles attached to the rotary table 32. FIG. 2 shows a load/unload station 42 adjacent to the rotary table 32 which has loaded an article 50 into the fixture 34. The rotary table 32 then indexes in the direction of the arrow to bring the fixture 34 and the article 50 adjacent to processing station 44 in the position formerly occupied by fixture 36 bringing the article 50 into position 52 to be processed by processing station 44. Subsequent indexes of the rotary table 32 will bring the fixture 34 and article 50 adjacent to processing station 46 placing the fixture 34 in position 38 and placing the article 50 in position 54. Likewise, indexing the rotary table 34 again brings the fixture 34 and article 50 into positions 44 and 56 respectively adjacent to processing station 48. Another index will bring the fixture 34 and article 50 back into adjacency with the load/unload station 42, where the processed article 50 can be unloaded and replaced by a new unprocessed article.

The rotary table may be replaced by a linear device such as an endless belt which fixtures articles for processing. In this arrangement the articles may be loaded at one point, indexed past processing stations and then unloaded at a separate point. The rotary table may also be replaced by a device which supports reciprocating motion, where the part is loaded at one point, the device moves the part to one or more processing stations and then returns the part to the load/unload point along the same path reversing direction. The common factor in all these devices is the need for high part positioning accuracy only at discrete positions within the motion system travel range. This is in contrast with the more typical cases in which positioning accuracy is required throughout the entire range of travel. Embodiments of this invention achieve the desired feedback resolution only within the immediate vicinity of the discreet index positions and thus reduce the cost associated with high-resolution/wide range feedback sensors which would otherwise have to be used. Embodiments of this invention use one low resolution/wide range sensor to cover the entire travel range of the motion system, and one high resolution/limited range sensor to provide high resolution feedback within the immediate vicinity of each discrete index positions associated with the motion system. An exemplary low resolution encoder is the Model H25 rotary encoder manufactured by BEI Industrial Encoders, Goleta, CA 93117. An exemplary high resolution encoder is the LIP 300 Linear Encoder, manufactured by Heidenhain Corporation, Schaumberg, IL 60173.

Figure 3:
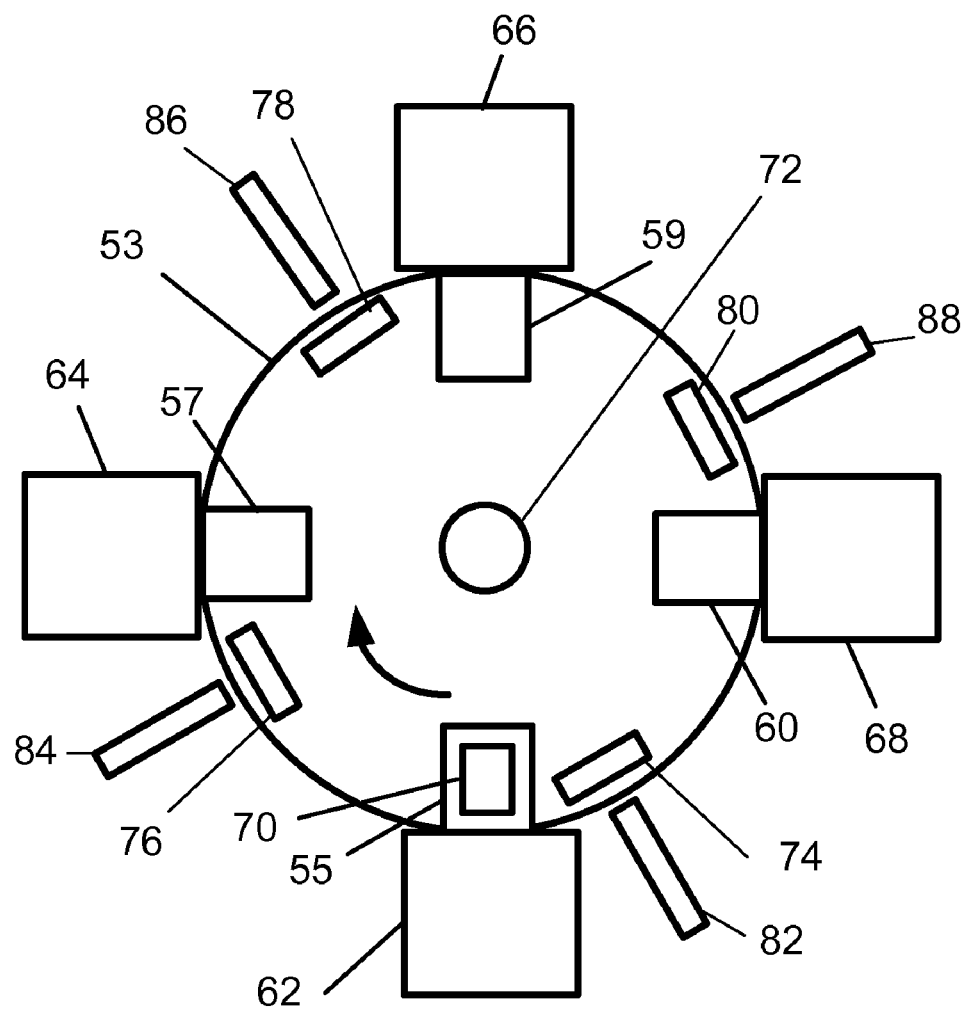
FIG. 3. Indexing motion stage with hybrid resolution feedback.

An embodiment of this invention is shown in FIG. 3. The rotary table 53 having fixtures 55, 57, 59, 60 for holding an article 70 adjacent to load/unload station 62 and subsequent processing stations 64, 66, 68 as the rotary table 53 indexes in the direction of the arrow. This embodiment is adapted according to the instant invention by the addition of a low or coarse resolution position feedback sensor 72 and high or fine resolution scales 74, 76, 78 and 80 applied to the rotary table 53 along with scanning heads 82, 84, 86 and 88 applied adjacent to the processing stations, For example, when the laser processing system (not shown) directs the rotary table 53 to index to place the fixture 55 and article 70 adjacent to processing station 64 according to information received from the low resolution position sensor 72, high resolution scale 74 will be brought into proximity with scanning head 84, thereby forming a high resolution position sensor, which then communicates high resolution positional information regarding the location of the rotary table 53 and hence the fixture 55 and article 70 with respect to the adjacent processing station 64.

The high resolution information received by the laser processing system may be used to correct the position of the article with respect to the laser processing system by instructing the motion stage to move or the information may be used to alter the path of the laser beam used to process the article electro-optically to compensate for the position of the article. In this embodiment the low resolution sensor may be a shaft encoder with a resolution of a few milliradians while the high resolution sensor may comprise a glass scale and an electro-optic scanning head with a resolution of a few microns.

The foregoing is presented in an exemplary fashion and other means of implementing this invention may be available which do not depart from the intent or meaning of this patent. We therefore request that the scope of this invention be only determined by the following claims:

I claim:

1. An improved method for laser processing articles with a laser processing system, said laser processing system having a motion stage, comprising:
providing a low resolution positional feedback device operatively connected to said motion stage to indicate the position of said motion stage in a first vicinity including a first position of the motion stage;
directing said motion stage to move to said first position indicated by said low resolution positional feedback device;
providing a high resolution positional feedback device operatively connected to said motion stage to indicate a second position of said motion stage in a second vicinity including said first position; and
communicating said second position indicated by said high resolution positional feedback device to said laser processing system.

2. The improved method of claim I wherein said laser processing system directs said motion stage to move to a third position indicated by said high resolution positional feedback device based on said communicated second position.

3. An improved laser processing system for laser processing articles having a motion stage, the improvements comprising:
a low resolution positional feedback device operatively connected to said motion stage to indicate a first position of said motion stage; and
a high resolution positional feedback device operatively connected to said motion stage in the vicinity of said first position to indicate a second position of said motion stage.

4. An improved method for laser processing articles with a laser processing system, said laser processing system having a laser, a laser beam, laser beam steering optics, a controller and a motion stage, the improvements comprising:
  providing a low resolution positional feedback device to indicate the position of said motion stage in a first vicinity including a first position of the motion stage;
  directing said motion stage to move to said first position indicated by said low resolution positional feedback device;
  providing a high resolution positional feedback device operatively connected to said motion stage to indicate a second position of said motion stage in a second vicinity including said first position; and
  communicating said second position indicated by said high resolution positional feedback device to said controller.

5. The improved method of claim 4 wherein said controller is configured to direct said motion stage to move to a third position indicated by said high resolution positional feedback device based on said communicated second position.

6. The improved method of claim 4 wherein said controller is configured to direct said laser beam steering optics to steer said laser beam based on said communicated second position.

7. A system comprising:
  a motion stage configured to support an article and move the supported article along a path within a range of travel;
  a first senor configured to detect, at a first resolution, a position of the motion stage within a first portion of the range of travel; and
  a second sensor configured to detect, at a second resolution higher than the first resolution, the position of the motion stage within the first portion of the range of travel.

8. The system of claim 7, wherein the motion stage is configured to be indexed to a plurality of discrete, spaced-apart index positions.

9. The system of claim 7, wherein the motion stage is configured to rotate.

10. The system of claim 7, further comprising a fixture coupled to the motion stage, wherein the fixture is configured to hold an article on the motion stage.

11. The system of claim 7. wherein the first senor is a shaft encoder.

12. The system of claim 7, further comprising at least one scale coupled to the motion stage such that the at least one scale is moveable along the path, wherein the second sensor is configured to detect the at least one scale when the motion stage is positioned within the first portion of the range of travel.

13. The system of claim 12, further comprising a plurality of scales coupled to the motion stage such that each of the plurality of scales is moveable along the path, wherein the second sensor is configured to detect one of the plurality of scales when the motion stage is positioned within the first portion of the range of travel.

14. The system of claim 7, further comprising a laser system including:
  a laser configured to emit a beam of laser pulses;
  beam steering optics configured to direct the emitted beam of laser pulses onto the an article supported by the motion stage.

15. The system of claim 14, further comprising a controller configured to control an operation of the laser system based upon the position of the motion stage detected by the second sensor.

* * * * *